(12) United States Patent
Chen et al.

(10) Patent No.: US 10,236,698 B2
(45) Date of Patent: Mar. 19, 2019

(54) MOVABLE CHARGING APPARATUS

(71) Applicant: PHIHONG TECHNOLOGY CO., LTD., Taoyuan (TW)

(72) Inventors: Chun-Chen Chen, Taoyuan (TW); Jian-Hsieng Lee, Tainan (TW); Hsiao-Tung Ku, Taoyuan (TW)

(73) Assignee: Phihong Technology Co., Ltd., Gueishan Township, Taoyuan County (TW)

( * ) Notice: Subject to any disclaimer, the term of this patent is extended or adjusted under 35 U.S.C. 154(b) by 0 days.

(21) Appl. No.: 15/421,898

(22) Filed: Feb. 1, 2017

(65) Prior Publication Data

US 2017/0358938 A1 Dec. 14, 2017

(30) Foreign Application Priority Data

Jun. 13, 2016 (CN) .......................... 2016 1 0410126

(51) Int. Cl.
| | |
|---|---|
| *H02J 7/00* | (2006.01) |
| *B60L 11/18* | (2006.01) |
| *H01H 71/02* | (2006.01) |
| *H02J 7/02* | (2016.01) |

(52) U.S. Cl.
CPC ......... *H02J 7/0042* (2013.01); *B60L 11/1818* (2013.01); *B60L 11/1824* (2013.01); *B60L 11/1825* (2013.01); *H01H 71/02* (2013.01); *H02J 7/0027* (2013.01); *H02J 7/0047* (2013.01); *H02J 7/0052* (2013.01); *H02J 7/0054* (2013.01); *H02J 7/022* (2013.01); *B60L 2210/30* (2013.01); *H02J 2007/0059* (2013.01); *Y02T 10/7005* (2013.01); *Y02T 10/7072* (2013.01); *Y02T 90/121* (2013.01); *Y02T 90/128* (2013.01); *Y02T 90/14* (2013.01)

(58) Field of Classification Search
CPC ....... H02J 7/0042; H02J 7/0027; H02J 7/0052
USPC .......................................................... 320/107
See application file for complete search history.

(56) References Cited

U.S. PATENT DOCUMENTS

| | | | |
|---|---|---|---|
| 9,592,742 B1* | 3/2017 | Sosinov | B60L 11/1827 |
| 2006/0028177 A1* | 2/2006 | Ferro | B62B 1/125 |
| | | | 320/114 |
| 2012/0074901 A1* | 3/2012 | Mohammed | B60L 11/1842 |
| | | | 320/109 |
| 2012/0242277 A1* | 9/2012 | Flemming | H02J 7/00 |
| | | | 320/104 |
| 2017/0117726 A1* | 4/2017 | Jore | H02J 7/0027 |

\* cited by examiner

*Primary Examiner* — Suchin Parihar (74) *Attorney, Agent, or Firm* — Muncy, Geissler, Olds & Lowe, P.C.

(57) ABSTRACT

The present invention provides a movable charging apparatus comprising a house, at least one storage portion and a plurality of movable units. The house is provided to allow a power converting module. The storage portions, located at a side of the house, is provided to allow a power cable and a charging cable. The plurality of movable units are located at a bottom of the house. The apparatus further comprises a control module, an auxiliary power module, a circuit breaker, a metering module, a thermal unit and a filtering unit.

11 Claims, 7 Drawing Sheets

MOVABLE CHARGING APPARATUS

TECHNICAL FIELD

The present invention generally relates to a charging apparatus, and more particularly, to a movable charging apparatus.

BACKGROUND

In current society, people live more conveniently attributed by industry and technology, meanwhile, living quality is gradually improved as well. However, there are large numbers of potential problems caused by industry and technology, such as ecological damage, energy crisis, source crisis and so on. Therefore, it's important to realize and start to solve the potential problems above for sustainable development of the earth. Everyone is under the obligation of energy conservation to protect earth ecology.

Take the development of public transportation as an example, bicycles and rickshaws in agricultural period were developed to motorcycles, vehicles and plans through industrial revolution to reduce the distances and times of transportation. Motorcycles and vehicles are driven by petroleum, thereby causing petroleum shortage and soaring the price of petroleum. Worse still, some irreversible problems would be generated, such as air pollutions. Therefore, it's important to develop green transportations which are low-pollution and low-energy-consumption, such as electric vehicles are common green transportations.

Rechargeable battery of electric vehicles could replace petroleum of traditional transportations to reduce pollutions. However, the rechargeable batteries have limited storage capacity, then, they should be charged regularly at stationary point. As a result, it's not convenient for drivers of electric vehicles.

In order to solve the problem of the conventional arts, the present invention provides a movable charging apparatus with communication which could move anywhere in the same plane. Furthermore, the movable charging apparatus of the present invention can be carried away to other place.

SUMMARY OF THE INVENTION

An object of the present invention is to provide a movable charging apparatus comprising a house, at least one storage portion and a plurality of movable units. The house is provided to allow a power converting module. The at least one storage portion, located at a side of the house, is provided to allow a power cable and a charging cable. The plurality of movable units, located at a bottom of the house, are provided for supporting and moving the apparatus on the ground.

According to the embodiment of the present invention, the apparatus further comprises a control module, an auxiliary power module, a circuit breaker, a metering module, a thermal unit and a filtering unit. The auxiliary power module, coupled to the control module, supplies power to main electrical components. The circuit breaker, coupled to the power converting module, is an automatically operated electrical switch designed to protect an electrical circuit from damage caused by overcurrent or overload or shot circuit. The metering module, coupled to the circuit breaker, is provided to calculate power and fee. The thermal unit, located at edge of the house, is provided for heat dissipation. The filtering unit, located at bottom of the house, is fireproof material.

According to the embodiment of the present invention, the apparatus further comprises a gripping portion, a display interface, a button, a recognition module and a communication module. The gripping portion, located at top of the house, includes a handle. The display interface, located at top surface of the house, includes human-machine interface. The button is located at top surface of the house and coupled to the circuit breaker. The recognition module, coupled to the control module via the display interface, includes RFID. The communication module, coupled to the control module via the display interface, includes at least one communication port.

According to the embodiment of the present invention, the movable charging apparatus further comprise at least one wheel with braking system. The storage portions further comprises a first storage portion and a second storage portion. The first storage portion, located at a first side of the house, receives a power cable. The second storage portion, located at a second side of the house, receives a charging cable. Wherein, the first side is corresponding to the second side, each of the first storage portion and the second storage portion has an elastic unit and a scroll bar.

BRIEF DESCRIPTION OF THE DRAWINGS

The components, characteristics and advantages of the present invention may be understood by the detailed description of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims. The layout of components may be more complicated in practice.

Figure 1:
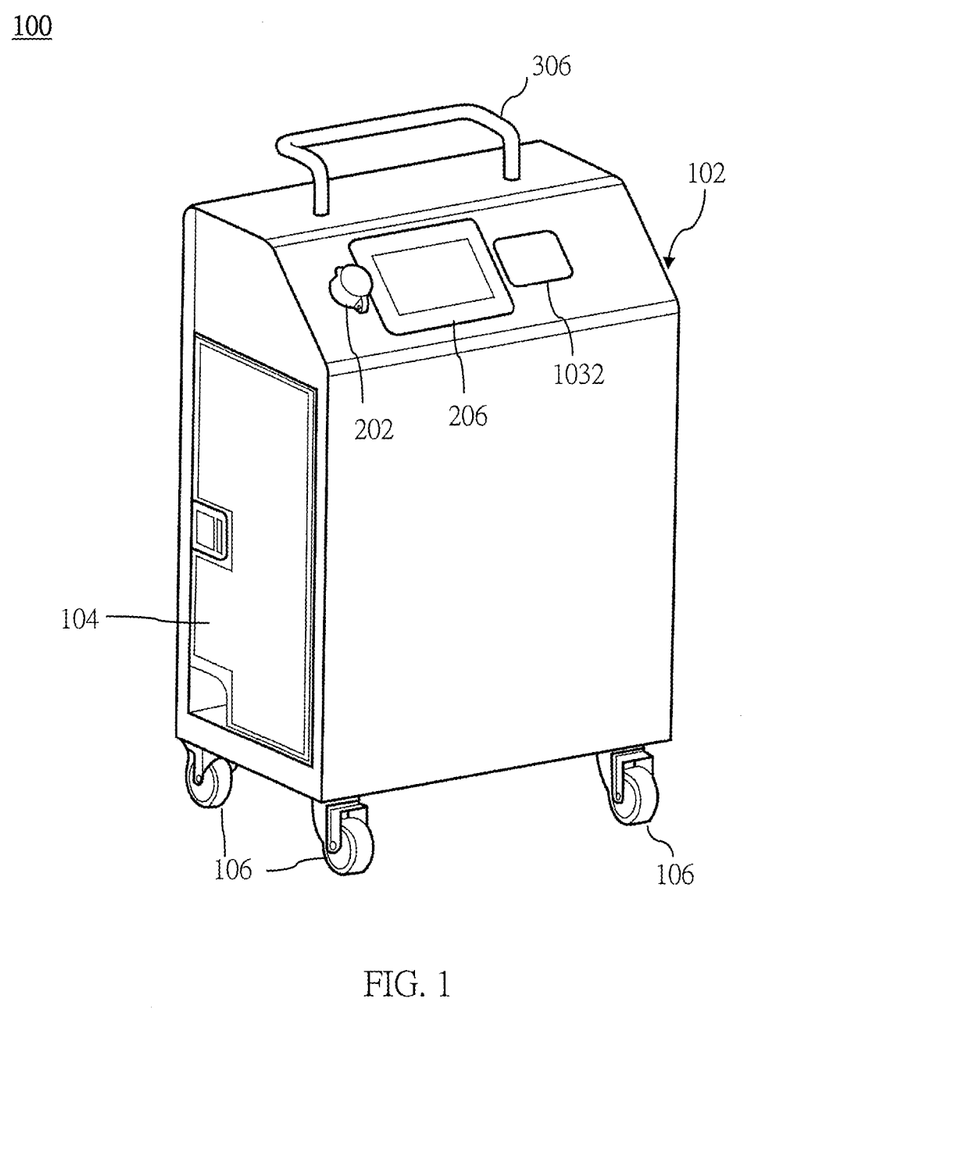
FIG. 1 illustrates a front view of the movable charging apparatus of the present invention.
Figure 2A:
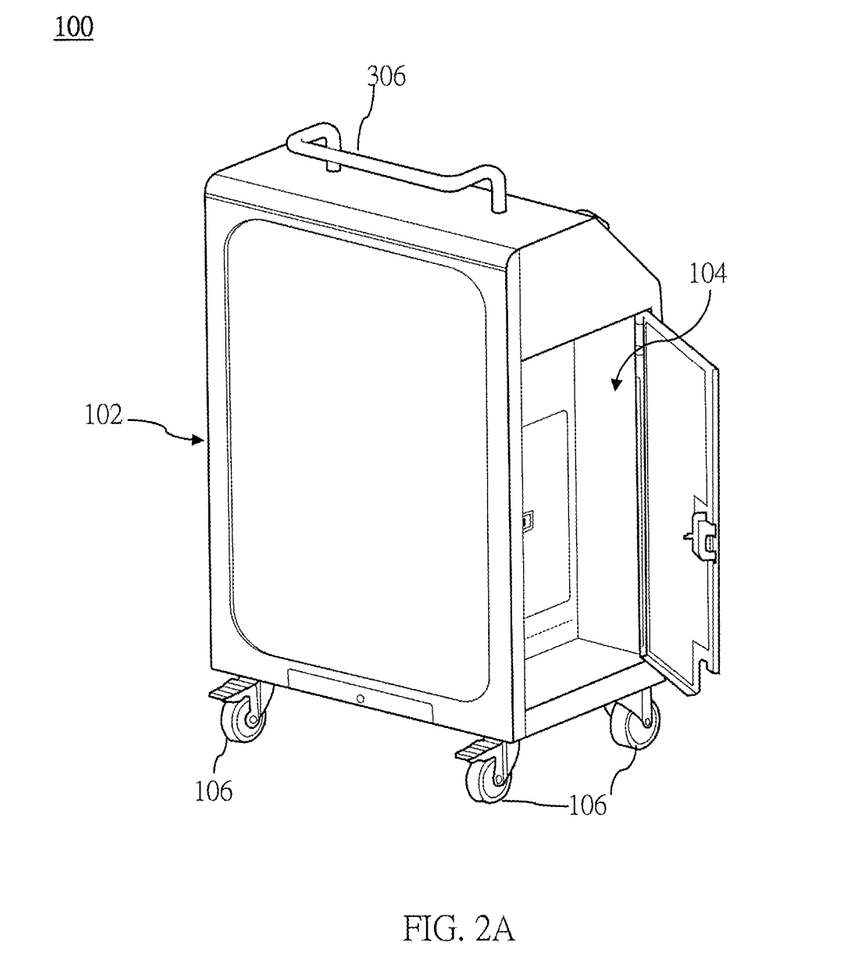
FIG. 2A illustrates a back view of the movable charging apparatus of the present invention.
Figure 2B:
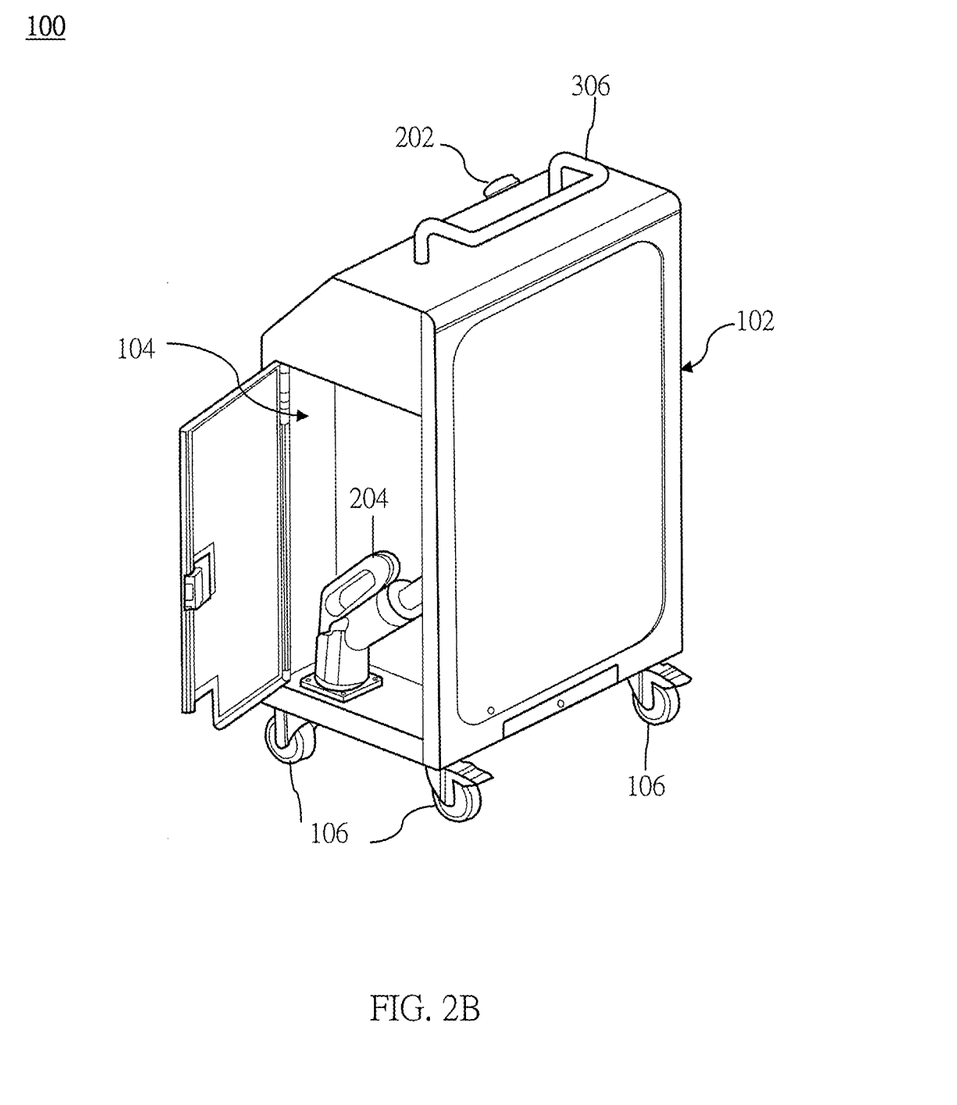
FIG. 2B illustrates another back view of the movable charging apparatus of the present invention.
Figure 3A:
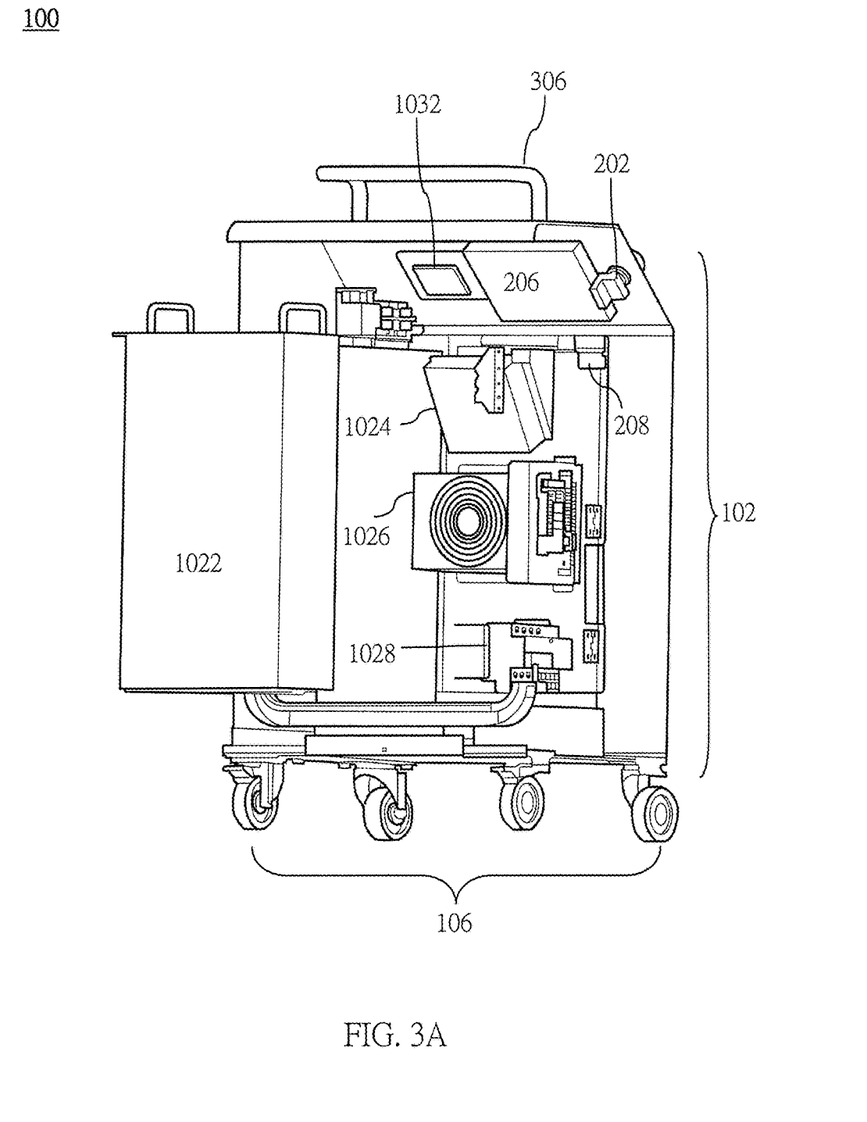
FIG. 3A illustrates back-exploded view of the movable charging apparatus of the present invention.
Figure 3B:
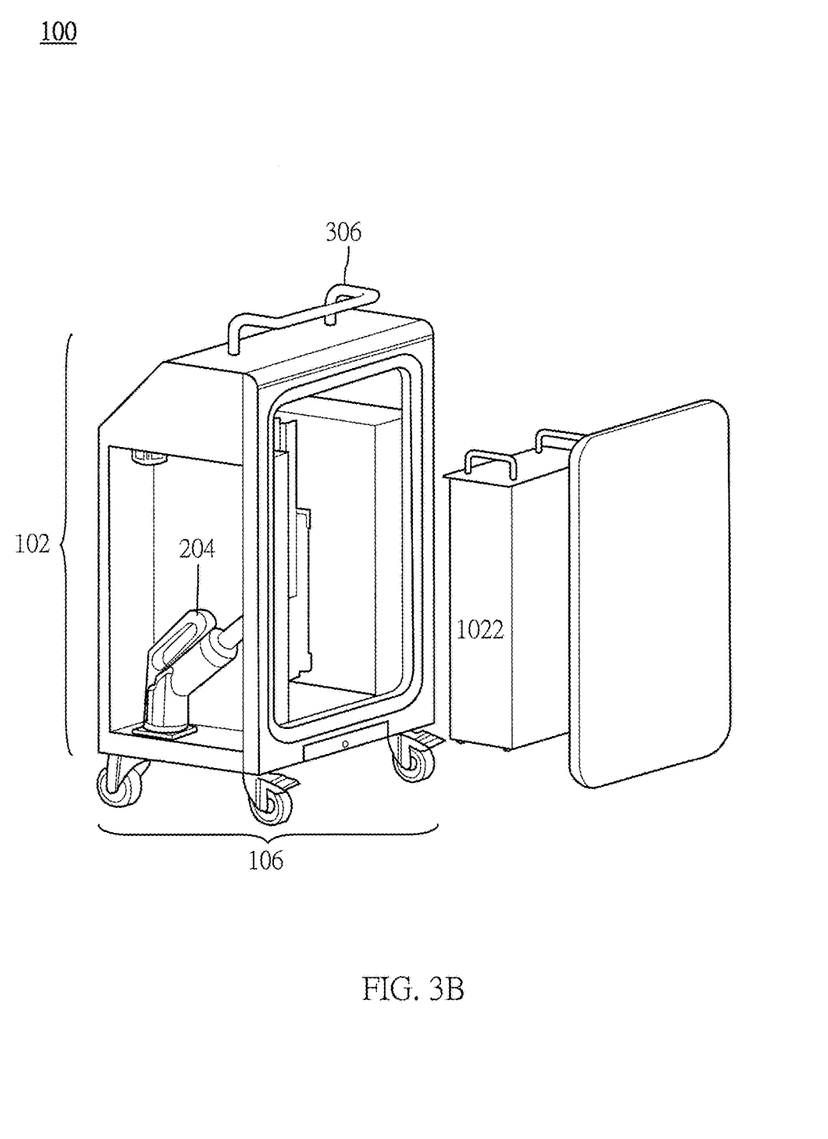
FIG. 3B illustrates back-exploded view of the movable charging apparatus of the present invention.

Referring to FIGS. 1, 2A, 2B, 3A & 3B, FIG. 1 shows a diagram of movable charging apparatus of the present invention. FIGS. 2A & 2B show the back views of movable charging apparatus of the present invention. FIGS. 3A &3B show the back-exploded views of movable charging apparatus of the present invention. It should be noted that the configuration of modules and units of the text and drawings is one of examples for illustration, but not limited to the present invention.

Figure 5:
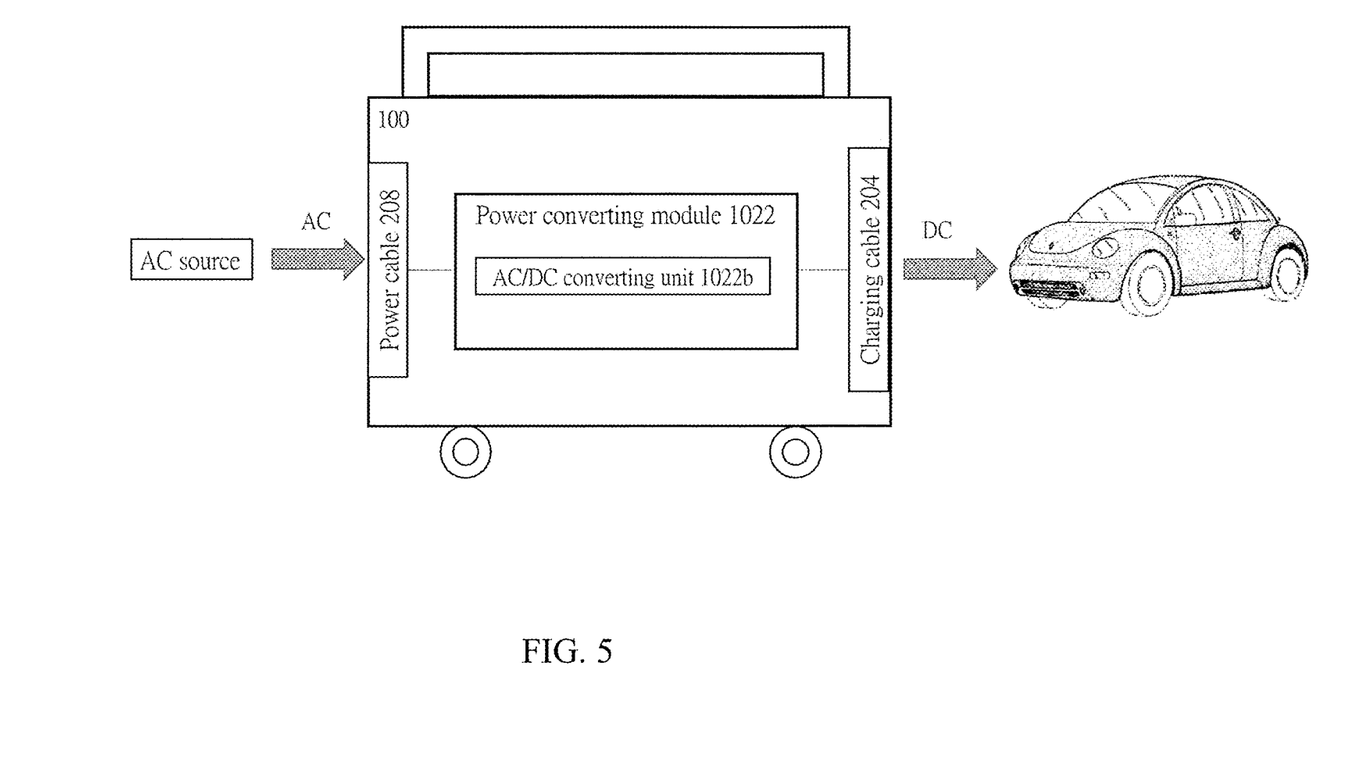
FIG. 5 illustrates a diagram of the charging process of the present invention.

The movable charging apparatus 100 of the present invention comprises a house 102, at least one storage portion 104 and a plurality of movable units 106. In the preferred embodiment, the apparatus 100, made by aluminum integrally, has high efficiency heat dissipation and being carried easily. The power converting module 1022 which is installed inside the house 102 for converting AC current into DC current, a charging cable 204 and a power cable 208 are coupled commonly to the power converting module 1022. AC current, generated from AC source, would be transmitted to the power converting module 1022 via power cable 208 for converting to DC current which would be transmitted to electric vehicle through charging cable 204. As shown in FIG. 5, it shows a schematic drawing of charging system of the present invention. Each of length of the power cable 208 and charging cable 204 can be modified and varied based on desire requirements.

Figure 4:
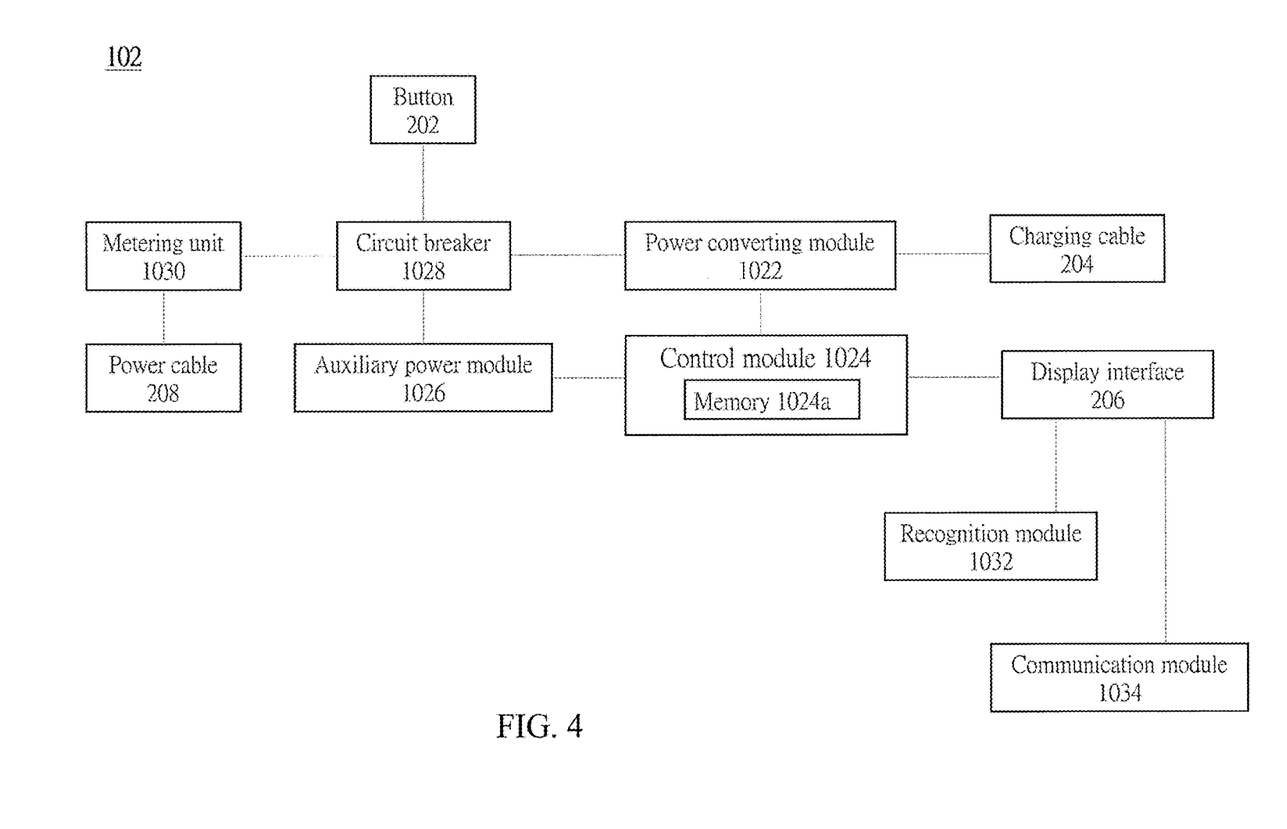
FIG. 4 illustrates a block diagram of the movable charging apparatus of the present invention.

Referring to FIG. 4, it shows a diagram of modules and components of the present invention. The power converting module 1022 comprises AC/DC converting unit 1022b for converting AC current into DC current to transmit to electric vehicle, as shown in FIG. 5. In one embodiment, the AC/DC converting unit 1022b includes rectifier, transformer, and so on. The power converting module 1022 further includes but not limited to power unit module, transistors, transformer, capacitor and digital signal processing (DSP), and so on. In one embodiment, the output voltage range of the power converting module 1022 is between 200V-750V, and output power of that is up to 20 kW.

Please refer to FIGS. 2A, 2B, 3A, 3B & 4, in one embodiment, the house 102 further comprises control unit 1024, auxiliary power module 1026, metering unit 1030, circuit breaker 1028 and other main components. The control unit 1024 can be as center for driving the apparatus 100. The control unit 1024 comprises memory 1024a for storing instructions and parameters. It is well understood by the skilled person in the art that the apparatus 100 is controlled by the instructions and parameters storing in the control unit 1024. The control unit 1024 further comprises other main components, fireware or software, such as logic unit (not shown in figures). Therefore, not being further illustrated hereinafter. In one embodiment, the auxiliary power module 1026, coupled to the control unit 1024, provides power to other components, such as control unit 1024, display interface 206 and so on, to maintain function. The auxiliary power module 1026 also can be called secondary power module or supplemental power module. The difference between power converting unit 1022 and auxiliary power module 1026 is that: the auxiliary power module 1026 provides power to only electric components within the apparatus 100, but not electric vehicle outside. In the embodiment, the output voltage of the auxiliary power unit 1026 could be 12V and 24V, the output power of that is between 400-700 W, preferably 400 W. The circuit breaker 1028, coupled to the power converting module 1022, is an automatically operated electrical switch designed to protect an electrical circuit from damage caused by overcurrent or overload or shot circuit. The circuit breaker 1028 includes magnetic circuit breaker, thermal magnetic circuit breaker, common trip breaker, medium-voltage circuit breaker, high-voltage circuit breaker, and so on. It is well understood by the skilled person in the art that the principle function of circuit breaker 1028, and category of that is based on desired requirements, therefore, the redundancy illustration is omitted hereinafter. The metering unit 1030, coupled between the circuit breaker 1028 and power cable 208, calculates the usage of power generated from AC source to outside electric vehicle, then calculates fee based on the usage of power and fee-charging standard which can be modified or varied according to requirements, such as energy policy being varying from country to country. The circuit breaker 1028 comprises a detective module (not shown in figures) and protective mechanism (not shown in figures). If power is over or short circuit detected by the detective module, then charging circuits would be closed by protective mechanism.

Please refer to FIGS. 2A, 2B, 3A & 3B, in one embodiment, the apparatus 100 further comprises a button 202 located at top thereof. It should be understood that the location of the button 202 is not limited to the top side, can be located at anywhere of the apparatus 100. The protective mechanism within circuit breaker 1028 would be triggered by pressing the button 202 which is coupled to the circuit breaker 1028, to stop charging to avoid from damage. In one embodiment, the button 202 includes a micro switch. To phrase it another way, the apparatus 100 can be terminated charging by remote server automatically, or by pressing the button 202 by users manually.

The storage portion (also could be called receiving portion) 104 includes a first storage portion 1042 and a second storage portion 1044. In one embodiment, the first storage portion 1042 is located at a side of the apparatus 100, and the second storage portion 1044 is located at other side of the apparatus. In other words, the locations of the two storage portions are corresponding with each other. For example, in the preferred embodiment, the first and the second storage portions 1042, 1044 are located at the right side and the left side of the apparatus 100, respectively. The first storage portion is used to receive at least one power cable 208, the second storage portion is used to receive the charging cable 204. In another embodiment, the first storage portion 1042 is provided to receive the charging cable 204, and the second storage portion 1044 is provided to receive the power cable 208. The locations of the power cable 208 and the charging cable 204 include but not limited to the design of right side and left as the foregoing embodiment, it can be modified and varied by the skilled person in the art depending on the desire and expectation of the users. The alternative design for achieving the same effect as the foregoing embodiment can be modified or varied by the person skilled in the art in the light of the need in use, thereby not being further illustrated hereinafter. It should be noted that locations of the charging cable 204 and the power cable 208 depends on the configurations of electronic units inside the house 102.

In one embodiment, each of the first and second storage portions 1042, 1044 has a scroll bar and an elastic unit (not shown in figures). Some length of the charging cable 204 and the power cable 208 are drawl out to required length by the elastic unit, and the remaining length of the charging cable 204 and the power cable 208 are storage into the scroll bar. As a result, it's convenient for receiving cables to avoid the tangled wires.

The pluralities of movable units 106, located at a bottom of the house 102, are provided for supporting and moving the apparatus 100 on the ground. The movable units 106 include wheels with braking system, located on the bottom of the apparatus 100. In the preferred embodiment, the apparatus further includes gripping portion 306, such as handle, located on the top of the apparatus 100. As shown in FIGS. 1, 2A, 2B, 3A & 3B, it's more easily to adjust the apparatus 100 to appropriate location by the combination of the movable unit 106 and the gripping portion 306.

Referring to FIGS. 2A & 4, in one embodiment, the apparatus further includes a display interface 206 coupled to the control unit 1024 and located at a side of the apparatus 100, such of the top side, as shown in FIG. 1. In the preferred embodiment, the display interface 206 may be a human-machine interface (HMI) for displaying status of the power module, such as storing, charging, warning and so on, Furthermore, users can input parameters via the human-machine interface. The display interface 206 includes touching screen.

In another embodiment, the apparatus 100 further comprises a communication module 1034 for transmitting/receiving parameters and instructions from servers, preferably, the communication module is a wireless communication module. The communication module 1034 is coupled to the control unit 1024 to supervise and modulate the charging status. The users can transmit information, such as invoice, quotation, advertisements, and so on, to display on the display interface 206. The communication module 1034 includes multiple communication ports (not shown in figures), but not limited to USB port.

In the preferred embodiment, the apparatus further comprises a recognition module 1032, coupled to the control unit 1024 through the display interface 206. The recognition module 1032 includes but not limited to automatic non-contact recognition, such as radio frequency identification (RFID), so that the user can be recognized by certification (such as credit cards) or inputting identifier (such as ID number) to control charging procedure. In another preferred embodiment, the recognition module 1032, the display interface 206 and the communication module 1034 can be integrated a platform (not shown in figures), so that the users can supervisor charging and transmit information via the platform.

In one embodiment, the control unit 1024 calculates fee with specific ratio based on power provided by the power converting module 1022, and the fee would be deduct from the credit card of user.

In one embodiment, the apparatus 100 further comprises multiple thermal units (not shown in figures) for dissipating heat generated from the power converting module 1022 and auxiliary power module 1026 to avoid being crashed or short circuit. In the preferred embodiment, the thermal units may be thermal fins for dissipating heat generated electric units inside house 102. Preferably, the thermal units can be positioned around the power converting module 1022.

In one embodiment, the apparatus 100 further comprises multiple filtering units (not shown in figures). In the preferred embodiment, the filtering units may be fire protection material with mesh including but not limited to polyester fiber and acetate fiber & Nylon which conforms the fire protective international standard, such as European DIN 53438-F1 and U.S.A. UL 900-Class 1. The purpose of the filtering unit is: insulate from impurity, such as dust.

As description above, the present invention provides a movable charging apparatus, and further provides another movable charging apparatus with communication. The movable charging apparatus comprises a house which is made of aluminum alloy. The house comprises a control unit, a power converting module, a recognition module and a communication module. On the other hand, the house further comprises two storage portions for receiving power cable and charging cable, respectively, and comprises handle and movable units located top and bottom thereof, respectively. Accordingly, the present invention not only is convenience, but also offers storage capability to solve the issue of the prior art.

Various terms used in this disclosure should be construed broadly. For example, if an element "A" is the to be coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

The foregoing descriptions are preferred embodiments of the present invention. As is understood by a person skilled in the art, the aforementioned preferred embodiments of the present invention are illustrative of the present invention rather than limiting the present invention. The present invention is intended to cover various modifications and similar arrangements included within the spirit and scope of the appended claims, the scope of which should be accorded the broadest interpretation so as to encompass all such modifications and similar structures.

What is claimed is:

1. A movable charging apparatus comprising:
   a house for receiving a power converting module;
   at least one storage portion, located at a side of said house;
   a plurality of movable units, located at a bottom of said house;
   a control module;
   an auxiliary power module, coupled to said control module;
   a circuit breaker, coupled to said power converting module;
   a metering module, coupled to said circuit breaker; and
   a thermal unit, located at edge of said house and around said power converting module and provided for heat dissipation, wherein said thermal unit includes thermal fins for dissipating heat generated by said power converting module and said auxiliary power module;
   wherein the circuit breaker is configured to protect said power converting module from damage caused by overcurrent, overload or short circuit.

2. The movable charging apparatus of claim 1, further comprising:
   a filtering unit, located at said bottom of said house, being fireproof material.

3. The movable charging apparatus of claim 1, said power converting module, coupled to said control module, comprising:
   an AC/DC converting unit;
   a power unit; and
   a digital processor.

4. The movable charging apparatus of claim 1, said storage portion further comprising:
   a first storage portion, located at a first side of said house, for receiving a power cable;
   a second storage portion, located at a second side of said house, for receiving a charging cable; and
   wherein said first side being corresponding to said second side, each of said first storage portion and said second storage portion has an elastic unit and a scroll bar.

5. The movable charging apparatus of claim 1, further comprising:
   a gripping portion, located at top of said house;
   a display interface, located at a top surface of said house; and
   a button, located at a top surface of said house and coupled to said circuit breaker.

6. The movable charging apparatus of claim 5, further comprising:
   a recognition module, coupled to said control module via said display interface; and
   a communication module, coupled to said control module via said display interface, said communication module comprising at least one communication port.

7. The movable charging apparatus of claim 6, said movable units comprising at least one wheel with braking system, said display interface comprising human-machine interface, said recognition module comprising RFID, said communication interface comprising USB.

8. A movable charging apparatus with communication, comprising:
   a control unit;
   a power converting module, coupled to said control unit, including:
      an AC/DC converting unit;
      a power unit; and
      a digital unit;
   a recognition module, coupled to said control unit;
   a communication module, coupled to said control unit, including at least one wireless communication port;
   an auxiliary power converting module, coupled to said control unit;
   a circuit breaker, coupled to said power converting module; and
   a metering unit, coupled to said circuit breaker; and
   a thermal unit, located around said power converting module and provided for heat dissipation, wherein said thermal unit includes thermal fins for dissipating heat generated by said power converting module and said auxiliary power converting module;
   wherein the circuit breaker is configured to protect said power converting module from damage caused by overcurrent, overload or short circuit.

9. The movable charging apparatus with communication of claim 8, comprising:
   a filtering unit, located at a bottom of said apparatus.

10. The movable charging apparatus with communication of claim 8, comprising:
    a gripping portion, located at a top of said apparatus;
    a display interface, located at a top surface of said apparatus;
    a button, located at said top surface of said apparatus and coupled to said circuit breaker;
    at least one storage portion, located a side of said apparatus; and
    a plurality of movable units, located at said bottom of said apparatus.

11. The movable charging apparatus with communication of claim 10, said storage portion comprising:
    a first storage portion, located at a first side of said apparatus, for receiving a power cable;
    a second storage portion, located at a second side of said apparatus, for receiving a charging cable; and
    wherein said first side being corresponding to said second side, each of said first storage portion and said second storage portion has an elastic unit and a scroll bar.

* * * * *